J. S. DE LONG.
TRANSPLANTER.
APPLICATION FILED JAN. 16, 1913.
1,062,585.
Patented May 27, 1913.
2 SHEETS—SHEET 1.
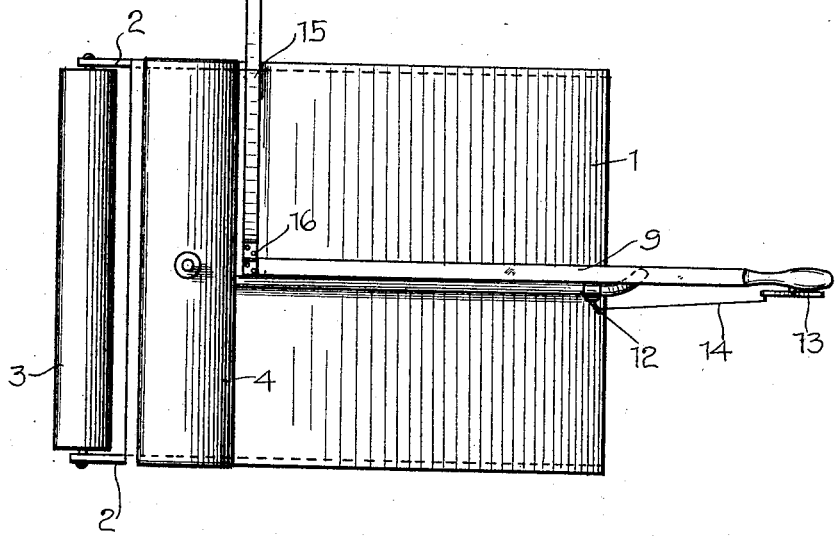
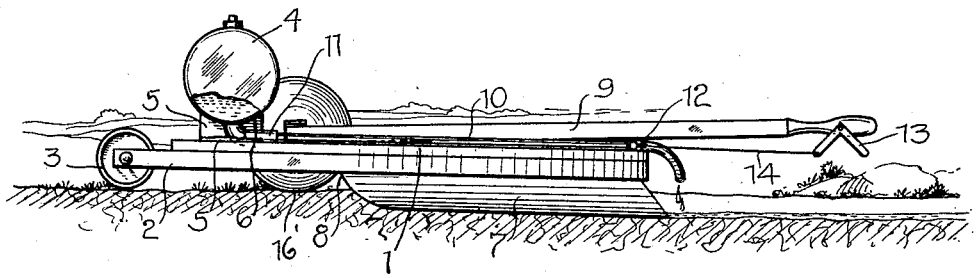
Witnesses
Robert M. Sutphen
A. D. Hind
Inventor
J. S. DeLong,
By Watson E. Coleman
Attorney
COLUMBIA PLANOGRAPH CO., WASHINGTON, D. C.

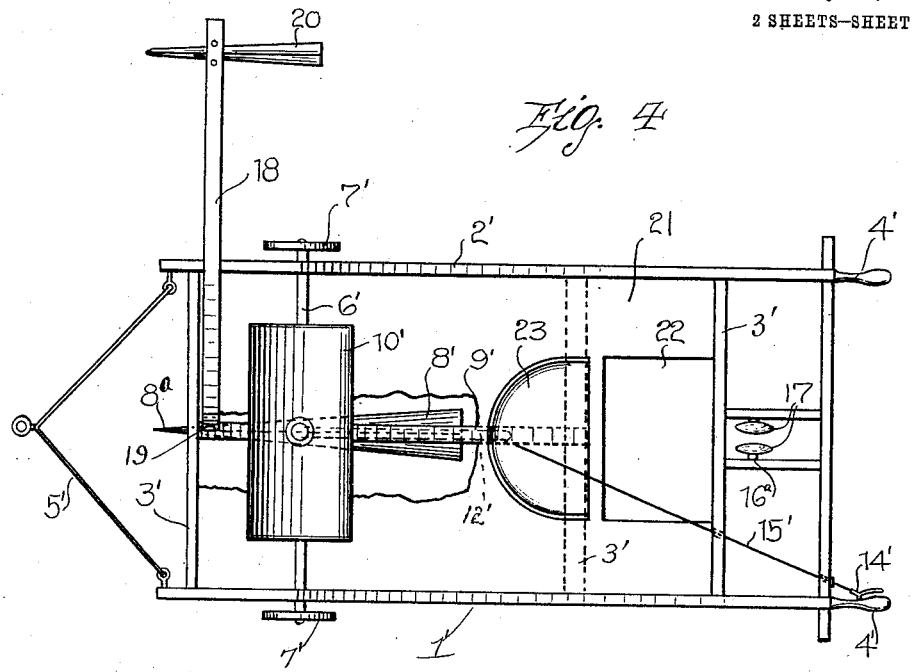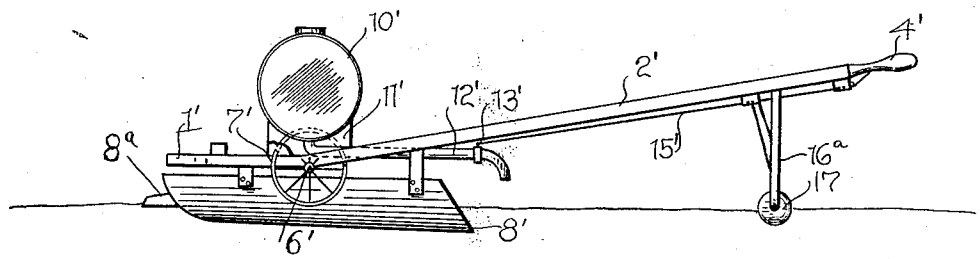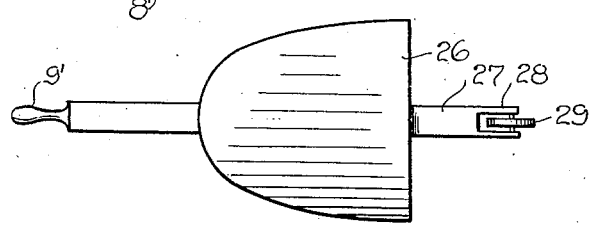

UNITED STATES PATENT OFFICE.

JOHN S. DE LONG, OF OSBORN, OHIO.

TRANSPLANTER.

1,062,585.  Specification of Letters Patent.  Patented May 27, 1913.

Application filed January 16, 1913. Serial No. 742,464.

*To all whom it may concern:*

Be it known that I, JOHN S. DE LONG, a citizen of the United States, residing at Osborn, in the county of Greene and State of Ohio, have invented certain new and useful Improvements in Transplanters, of which the following is a specification, reference being had to the accompanying drawings.

This invention relates to new and useful improvements in transplanters and the objects in view are to provide a machine of this character adapted to facilitate the setting out of young plants and in such setting out to secure the objects in view by successively forming a furrow for the reception of the plants and injecting water into the furrow at the same time the plants are dropped.

Another object of the invention is to provide a device of this character which will possess advantages in points of efficiency and durability, is inexpensive of manufacture and at the same time is simple in construction and operation.

With the above and other objects in view, the invention consists in the novel features of construction and the combination and arrangement of parts hereinafter more fully described, pointed out in the claims and shown in the accompanying drawings, in which—

Figure 1 is a top plan view of a transplanter constructed in accordance with my invention. Fig. 2 is a side elevation. Fig. 3 is a top plan view of the shoe or furrow opener. Fig. 4 is a modified form of the transplanter. Fig. 5 is a side elevation of the modified form. Fig. 6 is a side elevation of a modified form of furrow opener and Fig. 7 is a top plan view of still another modified form of the furrow opener.

Referring more particularly to the drawings, 1 indicates the platform, to the side edges of which are secured longitudinal pieces 2. The forward ends of the pieces 2 extend beyond the front end of the platform and a guide roller 3 is journaled in the extending ends of the pieces 2. Mounted upon the platform 1 at the front end thereof is a water tank 4 which is supported upon the platform by means of the blocks 5 which are provided with the upper concave faces 6 upon which the tank is adapted to rest. A shoe or furrow opener 7 is secured to the under side of the platform and is adapted to open a furrow into which the young plants are to be placed, said shoe being provided with a sharpened point 8 and increasing in thickness toward the rear end thereof so that the furrow will be made of sufficient size to permit of the ready insertion of the plants therein.

A longitudinal handle member 9 is secured to the central portion of the platform 1 and extending rearwardly thereof so that the machine may be pushed forwardly as the young plants are set in position. A hose or tube 10 is connected to the tank 4 by means of the pipe 11 and extends rearwardly and projects downwardly into the furrow at the rear of the shoe 7 so that as the furrow is opened the water may be discharged therein as required. The discharge of water from the hose 10 is controlled by means of the spring held valve 12 arranged in the tube 10 adjacent the rear end thereof and actuated by means of the bell crank 13 which is pivotally mounted upon the outer end of the handle 9, said bell crank being suitably connected to the valve by means of the cord 14. A transverse bar 15 is hingedly secured as shown at 16 to the inner end of the handle member 9 and is adapted to be disposed upon either side of the platform 1. The outer end of said bar projects beyond the longitudinal edges of the platform and mounted thereon is a marking disk 16' which, when one row is being set, is adapted to mark out the next row to be set.

It will be apparent from the above description taken in connection with the accompanying drawings that my improved transplanter is to be operated by hand, the operators getting down upon their knees and straddling the row in a direct line which has been previously made by the marker disk 16. In pushing the machine forward, the operator presses upwardly upon the outer end of the bell crank 13 so as to open the valve 12 and discharge water into the furrow. As the machine is pushed forward, as soon as the bell crank is released, the valve will close. The operator then leaves the machine and removes a sufficient number of plants from the platform 1 to fill the space in the furrow which has just been opened by pushing the machine forward. Each plant is placed in the furrow and the operator presses the dirt around the roots thereof with his hands, thus completely closing the furrow upon the roots of the plants.

In Fig. 4, I have illustrated a modified form of my improved transplanter which is adapted to be drawn by draft animals, and referring to the drawings, 1' indicates the frame which comprises the longitudinal side pieces 2' suitably connected by means of the transverse pieces 3', said side pieces 2' having suitable handles 4' formed at the rear end thereof, and secured to the forward ends thereof is a suitable hitch 5', whereby draft animals may be readily hitched to the frame. The forward end of the frame is suitably supported upon an axle 6' having the wheels 7' mounted upon the ends thereof and adapted to run upon the surface of the earth. A shoe or furrow opener 8' is secured to the under side of the longitudinal center beam 9' and is adapted to open a furrow into which the young plants are to be placed, said shoe being provided with a sharpened point 8ª which increases in thickness toward the rear end thereof so that the furrow will be made of sufficient size to permit of the ready insertion of the plants therein.

Mounted upon the frame and arranged transversely thereof is a water tank 10' which is supported by means of the brackets 11' having curved upper faces coincident with the circumference of the tank. Connected to the tank at the under side thereof is a suitable pipe or hose 12' which extends rearwardly and projects downwardly at the rear end of the shoe or opener 8' so that as the furrow is opened, the water may be discharged therein as required. The discharge of water from the pipe 12' is controlled by means of the spring held valve 13' arranged in the pipe adjacent the rear end thereof and actuated by means of the bell crank 14' which is pivotally mounted upon the outer end of one of the handles 4', said bell crank being suitably connected to the valve by means of the cord 15'. The rear end of the frame is supported by means of the vertical bars 16ª having mounted upon their lower ends the rollers 17 which are arranged in spaced relation and disposed upon opposite sides of the furrow to press the dirt around the plants as they are placed therein.

A transverse bar 18 is hingedly secured as shown at 19 to the central portion of the frame at the forward end thereof and is adapted to be disposed upon either side of the frame 1. The outer end of said bar projects beyond the longitudinal edges of the frame and mounted thereon is the marking shoe 20 which, when one row is being set, is adapted to mark out the next row to be set. It will be apparent that if it is desired, a platform 21 may be arranged upon the frame and provided with a suitable opening 22 at the rear end of the frame whereby the young plants may be readily deposited in the furrow. An operator's seat 23 may be mounted upon the platform at the rear of the opening 22 whereby the operator will be in position to quickly and easily place the plants within the furrow.

In Fig. 6, I have shown a modified form of furrow opener, wherein the shoe or opener is secured to the under side of a suitable board or strip 24, one end of which is provided with a suitable handle 25 whereby the shoe may be pushed through the ground and open a furrow for the insertion of the young plants. In Fig. 7, I have shown still another modified form of the invention wherein the shoe is secured to the under side of a platform 26 and secured to the front end of the shoe is a bar 27, the outer end of which is bifurcated to form the two spaced arms 28, between which is rotatably mounted the guide wheel 29. Secured to the rear of the shoe or opener 8 is a handle member 9' whereby the shoe may be readily pushed through the ground. It will be apparent that the modified form of my improved shoe or furrow opener is preferably used when it is desired to set the young plants out by hand.

It will be apparent from the above description taken in connection with the accompanying drawings that by the use of this form of transplanter, a large number of young plants may be quickly and easily transplanted within the ground. In the operation of the device, the draft animals are secured to the hitch 5', thus applying pulling power to the frame, the shoe 8' opening a suitable furrow as the frame is drawn forwardly. The operator sits upon the seat 23 and places the young plants in the furrow through the opening 22 in the platform, if the platform is to be used upon the frame. As the frame is drawn forwardly and a furrow is opened, the driver actuates the bell crank 14' opening the valve 13' to discharge water from the tank 10' into the furrow and as the frame passes along, the rollers 17 will press the dirt around the young plants which have been arranged within the furrow, thus completely closing the furrow upon the roots of the plants.

From the above description it will be readily apparent that I have provided a simple and durable transplanter whereby young plants may be quickly and easily set in the ground and at the same time may be supplied with a sufficient amount of water. It will also be apparent that the device is extremely simple in construction and can be manufactured at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the appended claims.

What I claim is:—

1. In a device of the character described, the combination of a platform, side bars secured to the longitudinal edges of the platform and projecting beyond the end thereof, a roller journaled in the projecting ends of the side bars, a shoe secured to the under side of the platform and adapted to open a furrow, a handle member secured to the platform and projecting rearwardly therefrom, a water tank mounted upon the platform, a tube having one end connected with the tank and the other end opening into the furrow made by said shoe, a spring valve arranged within said tube and means for actuating said valve for discharging water within the furrow at various intervals.

2. In a device of the character described, the combination of a platform, bars secured to the longitudinal edges of the platform and extending beyond one end thereof, a roller journaled between the extending ends of the bars, a shoe secured to the under side of the platform and adapted to open the furrow, a water tank mounted upon the platform at the forward end thereof, a tube having one end connected with the tank and the other end thereof opening into the furrow, a spring held valve arranged within said tube, a handle secured to said platform and projecting rearwardly and a bell crank lever mounted upon the rear end of the handle, a cord having one end connected to the valve and the other end to one end of the bell crank lever whereby the valve may be readily opened or closed to discharge water into the furrow and a row marker hingedly secured to the inner end of the handle member and adapted to be disposed upon either side of the platform.

3. In a device of the character described, the combination of a platform, side bars secured to the longitudinal edges of the platform and projecting beyond the end thereof, a roller journaled in the projecting ends of the side bars, a shoe secured to the under side of the platform and adapted to open a furrow, a handle member secured to the platform and projecting rearwardly therefrom, a water tank mounted upon the platform, and means for discharging water from the tank into the furrow at various intervals.

In testimony whereof I hereunto affix my signature in the presence of two witnesses.

JOHN S. DE LONG.

Witnesses:
J. F. ESTERLINE,
MORRIS D. RICE.

Copies of this patent may be obtained for five cents each, by addressing the "Commissioner of Patents, Washington, D. C."